June 3, 1958 — J. B. CESAK — 2,836,915
PICTURE FRAMES
Filed Feb. 15, 1955 — 2 Sheets-Sheet 1
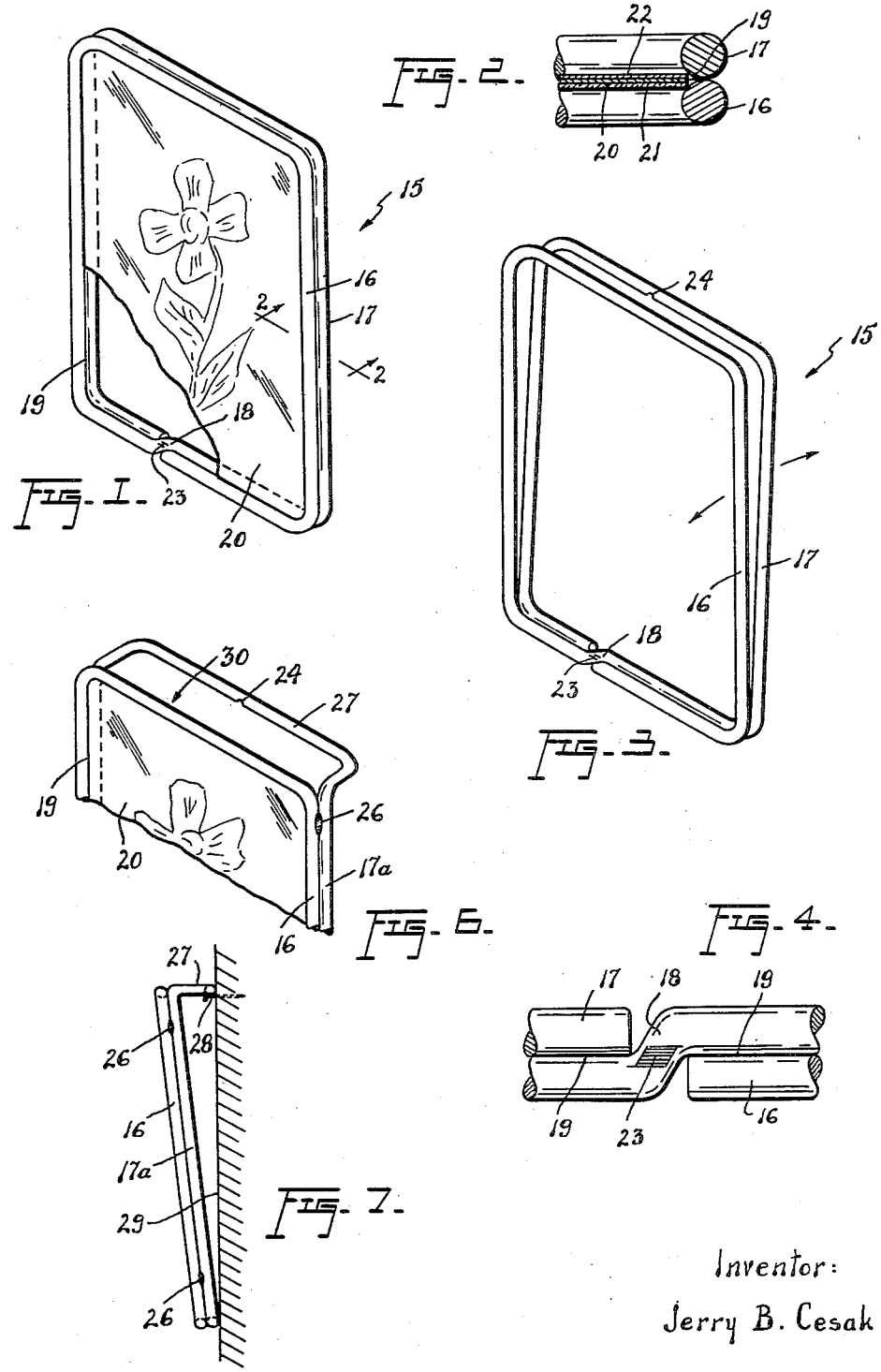
Inventor:
Jerry B. Cesak June 3, 1958   J. B. CESAK   2,836,915
PICTURE FRAMES
Filed Feb. 15, 1955   2 Sheets-Sheet 2
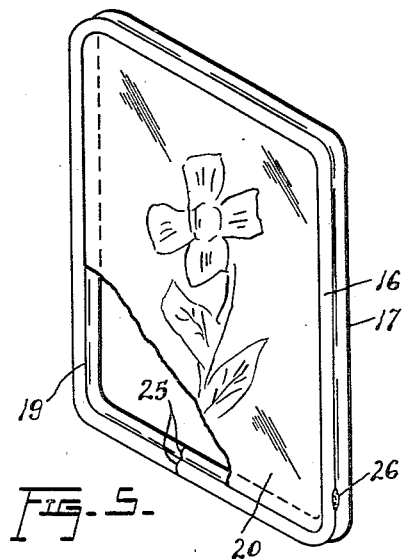
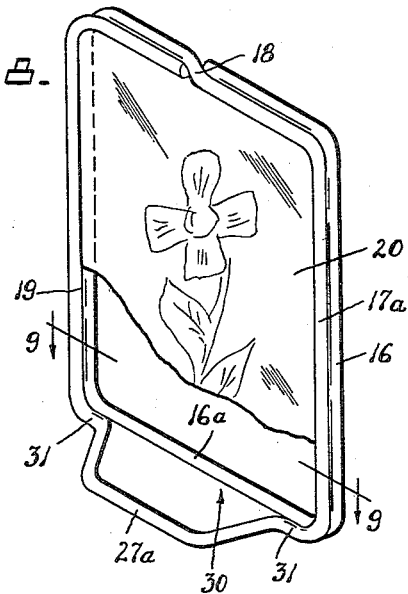
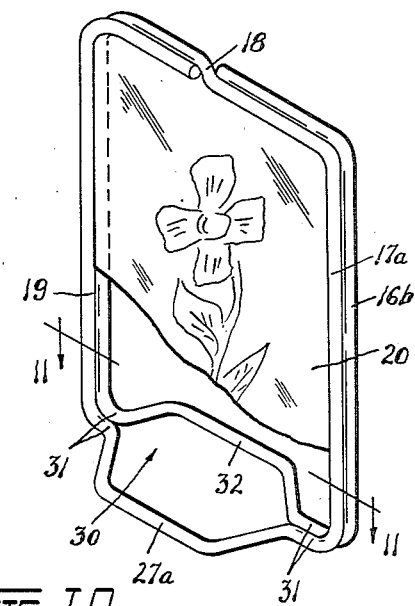
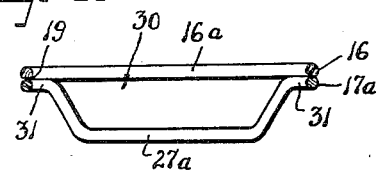
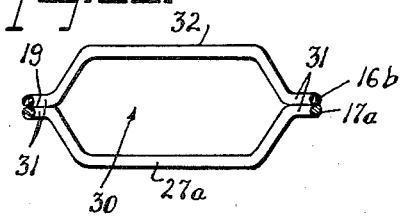
Inventor:
Jerry B. Cesak United States Patent Office 2,836,915
Patented June 3, 1958

2,836,915

PICTURE FRAMES

Jerry B. Cesak, Bladensburg, Md.

Application February 15, 1955, Serial No. 488,189

1 Claim. (Cl. 40—152.1)

This invention relates to new and useful improvements and structural refinements in picture frames, and the principal object of the invention is to provide a picture frame which is constructed solely from wire rod and thereby presents the currently popular "wrought iron" effect.

An important feature of the invention resides in the provision of means for sustaining a picture, or the like, together with the usual glass and backing for such picture within the wire rod frame.

Another important feature of the invention involves the provision of means for quickly and easily inserting a picture, or the like, in the frame, or removing the same therefrom with equal expediency.

Another feature of the invention resides in the provision of means for supporting the picture frame, either in a hanging position on a wall or in a standing position, such as on a desk, for example, the invention also contemplating a feature of reversibility, whereby the same frame may be supported selectively in either of these two positions.

An additional feature of the invention resides in the ability to display two pictures, or the like, at opposite sides of the same frame when the latter is supported in a standing position so that both sides thereof are exposed to view.

Some of the advantages of the invention lie in its simplicity of construction, in its durability, in its pleasing appearance and in its adaptability to convenient and economical manufacture.

With the above more important objects and features in view and such other objects and features as may become apparent as this specification proceeds, the invention resides in the construction substantially as shown in the accompanying drawings, wherein like characters of reference are employed to designate like parts and wherein:

Figure 1 is a perspective view of one form of the invention;

Figure 2 is a sectional detail on an enlarged scale and taken substantially in the plane of the line 2—2 in Figure 1;

Figure 3 is a perspective view, similar to that shown in Figure 1 but illustrating the manner in which the frame members are separated for insertion or removal of a picture panel;

Figure 4 is a fragmentary plan view on an enlarged scale, showing the cross-over of the wire rod between the frame members;

Figure 5 is a perspective view of a slightly modified form of the invention;

Figure 6 is a fragmentary perspective view of another modified form;

Figure 7 is a side elevational view of the invention shown in Figure 6 in position on a wall;

Figure 8 is a perspective view showing another form of the invention;

Figure 9 is a sectional detail, taken substantially in the plane of the line 9—9 in Figure 8;

Figure 10 is a perspective view showing another modified form; and

Figure 11 is a sectional detail, taken substantially in the plane of the line 11—11 in Figure 10.

Referring now to the accompanying drawings in detail, particularly to Figures 1-4 thereof, the picture frame is designated by the general reference numeral 15 and, in its entirety, is formed from a single piece of resilient wire rod which is angulated at the corners of the frame so as to provide two perimetric frame members 16, 17 disposed in a superposed, registering relation. To this end, an intermediate portion 18 of the rod crosses over from one frame member to the other as shown, whereby the frame members are disposed in parallel planes, and in contact with each other.

As is best shown in Figure 2, the round inner edge portions of the frame members 16, 17 coact to provide a seat 19 of a substantially V-shaped cross-section, the diameter of the rod from which the frame members are formed being such that this seat is wide enough to accommodate and retain therein the marginal edges of a picture panel 20, or the like, as well as the usual glass 21 and picture backing 22, if so desired. The seat 19 extends continuously along the entire inside perimeter of the frame and the aforementioned cross-over portion 18 between the two frame members is provided with a suitable notch or slot 23 in alignment with the seat 19, so that the continuity of the seat is uninterrupted.

When the picture panel 20, together with the glass 21 and backing 22 are to be inserted into or removed from the frame, the frame members 16, 17 are simply spread apart or separated against the resiliency of the wire rod from which they are formed, as shown in Figure 3, so that the picture panel, etc., may be inserted in or removed from the seat 19.

To facilitate hanging of the frame from a nail, or the like, in a wall, the back frame member 17 is provided at the underside of its top side with a nail receiving notch or slot 24.

In the slightly modified form of the invention shown in Figure 5, the two frame members 16, 17 are formed from two separate pieces of wire rod having their respective ends welded together as shown at 25. The two frame members 16, 17, themselves are secured together by one or more spots of welding 26, these spots of welding being so located that the frame members may be spread apart to facilitate insertion and removal of the picture panel, as already explained.

In another modified form of the invention shown in Figures 6 and 7, the picture panel receiving seat is provided only along the bottom and sides of the rectangular frame, while at the top of the frame the back frame member 17a is provided with a portion 27 which is offset rearwardly from the top of the front frame member 16. The offset portion 27 performs a double function, namely, it provides supporting means whereby the frame may be suspended from a nail 28 in a wall 29 in a slanting relation to the wall, as shown in Figure 7. Moreover, the portion 27 provides a clearance or entrance 30 at the top of the frame, whereby the picture panel 20, etc., may be inserted in or removed from its seat in the frame by a simple sliding movement. In this form of the invention the frame members 16, 17a need not be spread apart during insertion or removal of the picture panel and, therefore, may be rigidly secured together by spots of welding 26 along the bottom as well as both sides of the frame.

It will be readily apparent that this form of the invention may be formed integrally from a single piece of wire rod as in the embodiment of Figure 1, or from two pieces of wire rod as in the embodiment of Figure 5.

Moreover, with a slight modification shown in Figures 8 and 9, it may also be used in a reversible manner by being either suspended from a nail on a wall or supported in a standing position on a desk top, or the like. In the latter instance, the picture frame is simply turned upside down so that the offset portion 27 is disposed at the bottom of the frame and supports it in a standing position as illustrated in Figure 8.

However, in order to prevent any possibility of the picture panel, etc. from sliding downwardly through the entrance 30 at the bottom of the frame, keeper means are provided in the form of a pair of inwardly angulated rod portions 31 at the ends of the offset portion 27a and in contact with the adjacent bottom portion 16a of the frame member 16. In this manner the portions 31 and 16a coact in extending the picture panel seat at the top and sides of the frame to the corner portions at the bottom thereof, and thus prevent the picture panel from sliding downwardly. In this embodiment of the invention the frame members 16, 17a must be spread apart to facilitate insertion and removal of the picture panel, as in the embodiment of Figure 1, inasmuch as the keeper portions 31 prevent the picture panel from being inserted or withdrawn. However, if preferred, the keeper portions 31 need not be provided and the device as shown in Figure 6 simply used in its inverted position for standing on a desk, or the like, in which event removable keeper means of any suitable type may be used for sustaining the picture panel in its seat, if the friction between marginal edges of the picture panel and the seat is not sufficient to do so.

Figures 10 and 11 illustrate a further modified form of the invention and primarily intended for use in a standing position only. This form is similar to that shown in Figure 8, with the exception that the bottom portions of both frame members 16b and 17a are provided with mutually offset supporting portions 32 and 27a, respectively and with pairs of contacting keeper portions 31. The portions 32 and 27a extend to opposite sides of the picture frame and afford a greater amount of stability for the latter, apart from balancing its appearance. Otherwise, the embodiment of Figure 10 is identical to that of Figure 8 and the same remarks already made regarding the latter also apply to the former.

It will be noted that the embodiments of the invention shown both in Figure 8 and in Figure 10 readily lend themselves to the display of two pictures each, that is, two pictures on opposite sides of each frame, since both sides of the frame are exposed to view when the frame is in its standing position. In such event, of course, the usual picture backing is eliminated and two pictures are placed back to back with a covering glass on each side. Finally, it may be noted that the forms of the invention shown in Figures 6, 8 and 10, wherein the frame is provided with an entrance for the picture panel, etc., the marginal edge portions of the picture panel, glass and backing which are disposed in such an entrance may be covered with transparent adhesive tape, or the like, to prevent entry of dust or other foreign matter therebetween.

Also, while the invention is being referred to herein as a picture frame, it concerns itself only with the structure of the frame and a panel displayed therein, regardless of the picture, written or printed indicia, or any other material which the panel itself may carry.

While in the foregoing there have been shown and described the preferred embodiments of the invention, various modifications may become apparent to those skilled in the art to which the invention relates. Accordingly, it is not desired to limit the invention to this disclosure, and various modifications may be resorted to, such as may lie within the spirit and scope of the appended claim.

What is claimed as new is:

In a picture and the like, the combination of a frame formed integrally from a single piece of round wire rod possessing resilient characteristics and comprising two perimetric frame members disposed in registering relation, said frame members being normally in contact with each other and integrally connected together at one point along their perimetric length by a cross-over portion of said rod extending from one frame member to the other, the round inner edge portions of said frame members coacting to provide a seat of a substantially V-shaped cross-section, said cross-over portion of said rod being provided with a V-shaped notch in alignment with and constituting an endless continuation of said seat, and a display panel removably positioned in said frame and having its marginal edges disposed in and coextensive with the seat, a portion of one of said frame members being offset from the other frame member whereby to provide combined supporting means for the frame and an entrance means to facilitate insertion and removal of said display panel in and from said seat, regions of said frame members at the opposite sides of said entrance means being in separable contact and providing keeper means for sustaining said panel in said seat.

References Cited in the file of this patent

UNITED STATES PATENTS

| | | |
|---|---|---|
| 363,525 | Lipp | May 24, 1887 |
| 884,637 | Bythinar | Apr. 14, 1908 |
| 1,081,018 | Clough | Dec. 9, 1913 |
| 1,933,474 | Ekedahl | Oct. 31, 1933 |
| 2,127,930 | Osborn | Aug. 23, 1938 |
| 2,208,019 | Darling | July 16, 1940 |